Nov. 27, 1934.   J. T. CATLETT   1,982,371
ARC WELDING SYSTEM
Filed Sept. 19, 1933
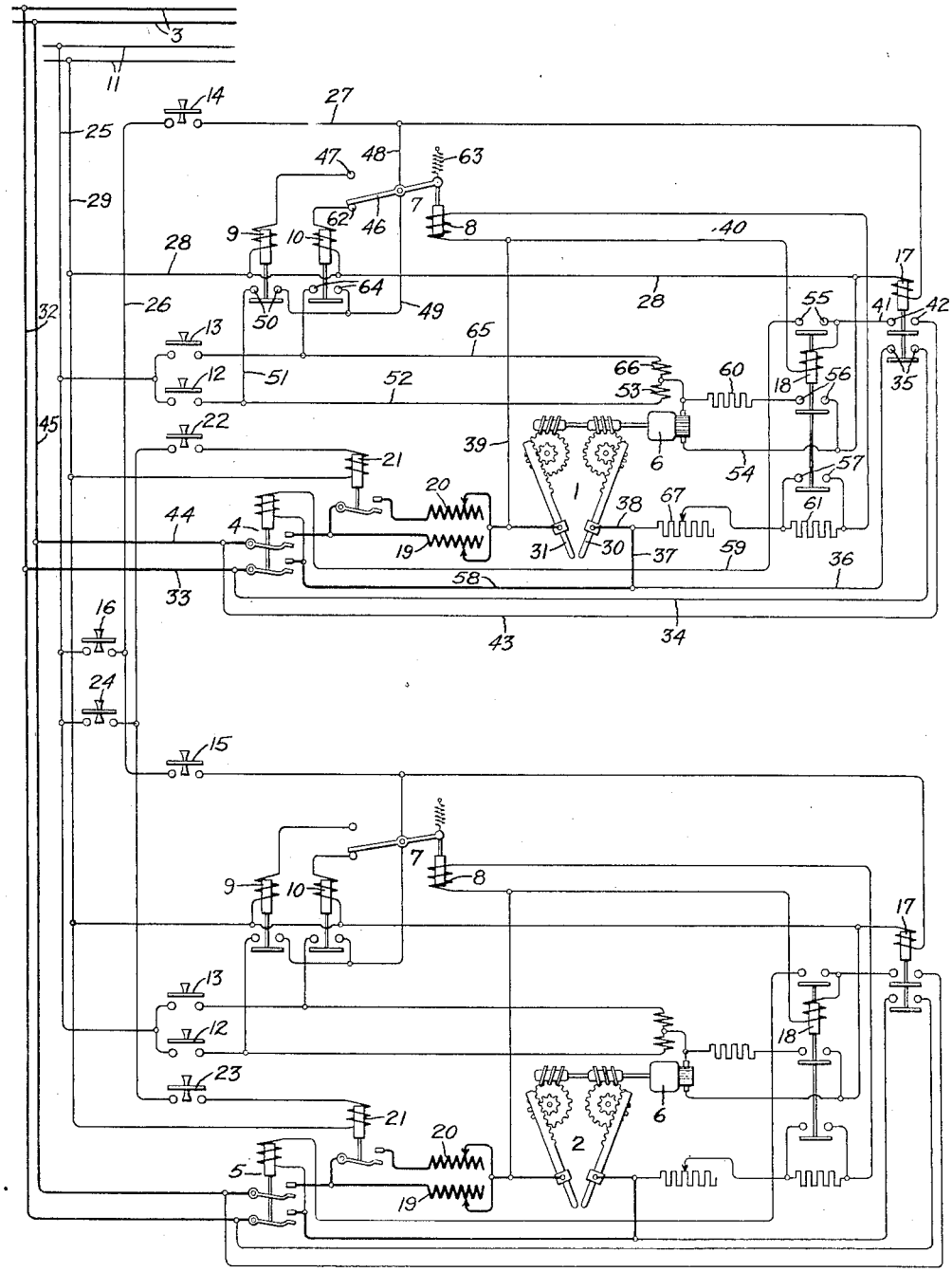
Inventor:
James T. Catlett,
by Harry E. Dunbury
His Attorney.

Patented Nov. 27, 1934

1,982,371

UNITED STATES PATENT OFFICE 1,982,371

ARC WELDING SYSTEM

James T. Catlett, Scotia, N. Y., assignor to General Electric Company, a corporation of New York Application September 19, 1933, Serial No. 690,090

5 Claims. (Cl. 219—8)

My invention relates to arc welding.

It is an object of my invention to provide flexible means for controlling a plurality of welding units.

It is a further object of my invention to provide an improved means for striking welding arcs which is of particular utility when using metallic electrodes.

Further objects of my invention will become apparent from a consideration of the following description of one embodiment thereof diagrammatically illustrated in the accompanying drawing in which the switches, relays and regulators are shown in their open and deenergized positions.

Two welding units 1 and 2 are illustrated in this drawing. Unit 1 is connected to a source of supply 3 by means of a switch 4 and unit 2 is connected to the same source of supply by means of a switch 5. Each unit is controlled by an automatic electrode feeding means including a feed motor 6 whose direction of rotation is controlled by a regulator 7 the operating coil 8 of which is connected across the electrodes so as to be responsive to arc voltage. The regulator operates through relays 9 and 10 to complete connections to a control circuit 11 by means of which the feed motor 6 is rotated in the proper direction to feed the electrodes toward or away from one another to strike and thereafter maintain a welding arc between them. The rotation of the feed motor may also be controlled by means of switches 12 and 13. Provided switches 14 and 15 are closed, units 1 and 2 may be simultaneously energized or deenergized by the operation of a switch 16. These switches complete the energizing circuits for relays 17 by means of which the electrodes of each unit are initially connected to the source of supply 3 independently of switches 4 and 5 through a high impedance circuit which in the particular embodiment illustrated is the operating coil of electromagnetic switch 18. Upon the closing of switches 18 the operating coils of switches 4 and 5 are energized and these switches connect the welding electrodes to the source of supply through a low impedance circuit including either or both the impedances 19 and 20. Impedance 20 may be connected in parallel with impedance 19 to increase the welding current through the agency of electromagnet switches 21 whose operating coils are energized and deenergized through switch 22 for unit 1 and through switch 23 for unit 2. Simultaneous operation of switches 21 for increasing the welding current in each unit may be accomplished through switch 24.

The system illustrated will be better understood from a consideration of its operation.

In order to energize unit 1 switches 16 and 14 are closed. This completes the energizing circuit for relay 17 through the following circuit: From one conductor of the control circuit 11 through conductor 25, switch 16, conductor 26, switch 14, conductor 27, the operating coil of switch 17, and conductors 28 and 29 to the other conductor of control circuit 11. The closing of switch 17 connects the electrodes 30 and 31 to the source of welding supply 3 through the following circuit: From one conductor of the source of supply 3 through conductors 32, 33 and 34, contacts 35 of switch 17, conductors 36, 37 and 38, electrodes 30 and 31, conductors 39 and 40, the operating coil of switch 18, conductor 41, contacts 42 of switch 17 and conductors 43, 44 and 45 to the other conductor of the source of supply 3.

If the electrodes 30 and 31 are separated as illustrated in the drawing the voltage across them will energize the coil 8 of regulator 7 and move its contact 46 into engagement with its fixed contact 47 thereby completing the following circuit: From one conductor of the control circuit 11 through conductor 25, switch 16, conductor 26, switch 14, conductors 27 and 48, contacts 46 and 47 of regulator 7, the operating coil of relay 9 and conductors 28 and 29 to the other conductor of the control circuit 11. The closing of relay 9 energizes the feed motor 6 through the following circuit: From one conductor of the control circuit 11 through conductor 25, switch 16, conductor 26, switch 14, conductors 27, 48 and 49, contacts 50 of relay 9, conductors 51 and 52, field 53 and the armature of feed motor 6, conductors 54, 28 and 29 to the other conductor of the control circuit 11. By reason of this connection the feed motor rotates in a direction to feed the electrodes 30 and 31 toward one another.

As soon as the electrodes engage one another the operating coil of the switch 18 is energized through the circuit traced above and completes circuits through its contacts 55, 56 and 57. A circuit for the operating coil of switch 4 is completed through contacts 55 and follows: From one conductor of the source of supply 3 through conductors 32, 33, 34, contacts 35 of switch 17, conductors 36, and 58, the operating coil of switch 4, conductor 59, contact 55 of switch 18, conductor 41, contact 42 of switch 17, and conductors 43, 44 and 45 to the other conductor of the source of supply 3. The closing of contacts 56 shunts the armature of feed motor 6 through a resistance 60 and this causes the feed motor to thereafter operate at a lower speed than the speed at which it operated initially. The closing of contacts 57 short circuits a protective resistance 61 inserted in the circuit of the operating coil 8 of the regulator 7. The coil 8 of the regulator is primarily adapted for arc voltages and the resistance 61 is employed to protect it against the higher voltage of the welding circuit 3 to which this coil is connected before the welding arc is established. As soon as the electrodes 30 and 31 engage one another the operating coil 8 of the regulator 7 is deenergized by being short circuited and its contact 46 is moved into engagement with its fixed contact 62 through the biasing action of a spring 63. The engagement of contacts 46 and 62 complete the following circuit: From one conductor of the control circuit 11 through conductor 25, switch 16, conductor 26, switch 14, conductors 27 and 48, contacts 46 and 62 of regulator 7, the operating coil of relay 10 and conductors 28 and 29 to the other conductor of the control circuit 11. The closing of relay 10 energizes the feed motor 6 through the following circuit: From one conductor of the control circuit 11 through conductor 25, switch 16, conductor 26, switch 14, conductors 27, 48, and 49, contacts 64 of relay 10, conductor 65, field 66 and the armature of feed motor 6, conductors 54, 28, and 29 to the other conductor of the control circuit 11.

As soon as the electrodes have been separated a predetermined distance which is determined by the adjustment of the resistance 67 in series with the operating coil of regulator 7 the movable contact 46 is moved from engagement with the fixed contact 62. Thereafter contact 46 moves in response to arc voltage into engagement with contact 47 or contact 62 to control the direction of rotation of the feed motor 6 and thereby maintain substantially constant the length and voltage of the arc established between the electrodes.

It will be noted that the electrodes 30 and 31 are initially connected to the source of supply 3 through the operating coil of switch 18 and thereafter through a circuit of high impedance and that at substantially the same time that the electrodes are separated from one another to strike the welding arc these electrodes are connected through the source of supply 3 through a low impedance circuit through the agency of switch 4. If metallic electrodes are initially connected to a source of supply through a low impedance circuit they very often weld together during the operation of striking the arc and thus cause faulty operation of the welding system. With a heavy current available the ends of the electrodes become welded and before the inertia of the feeding means can be overcome and the electrodes withdrawn from one another to strike the arc the resistance drop between the electrodes decreases and the electrodes are sufficiently cooled to permit the occurrence of this welding operation. By connecting the electrodes initially through a high impedance circuit such as the operating coil of the electromagnetic switch 18 the electrodes are connected to the source of supply through a low impedance circuit at substantially the same time that the electrode feeding means is operated in a direction to withdraw the electrodes. The slight delay in supplying the welding current through the low impedance circuit is sufficient to permit the feeding means to overcome its inertia so that the electrodes are withdrawn from one another before their ends have an opportunity of welding together.

Because the electrodes are initially connected to the source of supply through a high impedance circuit, it is also possible to feed them toward one another during the arc striking operation at a higher rate of speed than is normally employed since the impact of the electrodes upon engaging one another will not facilitate the resistance welding operation which occurs between electrodes that are connected to a source of supply through a low impedance circuit before the arc is struck. After the arc has once been established between the electrodes, it is necessary to have the feed motor operate at a slower rate of speed in order to eliminate hunting action during the subsequent feeding of the electrodes to maintain the welding arc. It is for this reason that after the electrodes have once engaged one another the speed of the feed motor is reduced by some suitable means such as by connecting in shunt to its armature the resistance 60 as described above.

The control of unit 2 is identical with the control described above for unit 1. It will be noted, however, that the two control systems are connected to one another by master switches 16 and 24 so that both units may be started or stopped at the same time by the operation of switch 16 and so that the current supplied to both units may be increased or decreased at the same time by the operation of switch 24. Thus when switches 14 and 15 are closed the closure of switch 16 will start the operation of both units. After switch 16 has been operated either unit may be deenergized by opening switches 14 or 15. Likewise after switches 22 and 23 are closed the closure of switch 24 will simultaneously operate switches 21 and increase the welding current supplied to each unit by connecting impedances 20 in parallel with impedances 19. The current supplied to either unit may then be decreased by opening switches 22 or 23.

The operation and direction of rotation of each of the feed motors associated with each unit is also under the control of switches 12 and 13 by means of which the electrodes may be adjusted relative to one another when the unit is not in operation and under the control of the automatic regulator associated therewith. Thus, by closing switch 12 the feed motor may be caused to rotate in the proper direction to feed the electrodes together and by closing switch 13 the feed motor may be made to rotate in the opposite direction to feed the electrodes away from one another.

In the system illustrated and described only two welding units have been illustrated. It is of course apparent that any number of units may be employed in accordance with the teachings of my invention. My invention is particularly applicable to the apparatus employing a plurality of welding units which may work on the same article or a plurality of articles at the same time. The invention is not limited to units of the particular construction represented in the drawing, since the welding arc may be established between the electrode and the work which constitutes a cooperating electrode. In the particular arrangement illustrated the voltage across the electrodes has been used for controlling the feeding of the electrodes toward and away from one another. It is, of course, apparent that this feeding operation may be under the control of the welding current, or any other characteristic of the welding circuit including the electrodes.

What I claim as new and desire to secure by Letters Patent in the United States is:

1. An arc welding system comprising means responsive to an electrical characteristic of the welding circuit for feeding an electrode toward and away from a cooperating electrode to strike and thereafter maintain a welding arc, means for initially connecting said electrodes to a source of supply through a high impedance circuit, and means for thereafter connecting said electrodes to said source of supply through a low impedance circuit at substantially the same time that said electrodes are separated from engagement with one another to strike the welding arc.

2. An arc welding system comprising means responsive to an electrical characteristic of the welding circuit for feeding an electrode toward and away from a cooperating electrode to strike and thereafter maintain a welding arc, means for initially connecting said electrodes to a source of supply through a high impedance circuit, means for thereafter connecting said electrodes to said source of supply through a low impedance circuit at substantially the same time that said electrodes are separated from engagement with one another to strike the welding arc, and means for decreasing the operating speed of said feeding means after said electrodes have been brought into engagement with one another to strike the welding arc.

3. Automatic arc welding apparatus comprising means responsive to an electrical characteristic of the welding circuit for feeding an electrode toward and away from a cooperating electrode to strike and thereafter maintain a welding arc, means including an electromagnetic switch for connecting when energized said electrodes through a low impedance circuit to a source of supply at substantially the same time that said electrodes are separated from engagement with one another to strike the welding arc, and means for initially connecting said electrodes to said source of supply through the operating coil of said electromagnetic switch.

4. An arc welding system comprising a plurality of units, means for simultaneously energizing and deenergizing all of said units, means for deenergizing any one of said units after said last-mentioned means has been operated to energize all of said units, means for increasing and decreasing simultaneously the current supplied to all of said units, and means for independently decreasing the current supplied to any of said units after said last-mentioned means has been operated.

5. An arc welding system comprising a plurality of units, means responsive to an electrical characteristic of the welding circuit for feeding an electrode of each of said units toward and away from a cooperating electrode to strike and thereafter maintain a welding arc, means for simultaneously connecting the electrodes of each of said units through high impedance circuits to a source of supply, means for simultaneously connecting the electrodes of each of said units to said source of supply through low impedance circuits at substantially the same time that said electrodes are separated from engagement with one another to strike welding arcs, means for deenergizing any one of said units after said last-mentioned means has been operated to connect all of said units to said source of supply, means for simultaneously increasing and decreasing the current supplied to each of said units, and means for decreasing the current supplied to any one of said units after said last-mentioned means has been operated to increase the current supplied to all of said units.

JAMES T. CATLETT.